United States Patent [19]
Thibaut

[11] 3,927,541
[45] Dec. 23, 1975

[54] DEVICE FOR CONTROLLING THE SPIN-DRYING SPEED IN A WASHING MACHINE

[75] Inventor: Yves Albert Daniel Thibaut, Amiens, France

[73] Assignee: U.S. Philips Corporation, New York, N.Y.

[22] Filed: July 2, 1974

[21] Appl. No.: 485,224

[30] Foreign Application Priority Data
July 5, 1973 France .............................. 73.24693

[52] U.S. Cl. .................................... 68/12 R; 68/24
[51] Int. Cl.² ...................................... D06F 33/00
[58] Field of Search ...... 318/59, 398, 416; 68/12 R, 68/23, 23.4, 24, 207

[56] References Cited
UNITED STATES PATENTS
3,640,098  2/1972  Eastall .............................. 68/12 R Primary Examiner—Houston S. Bell, Jr.
Attorney, Agent, or Firm—Frank R. Trifari; David R. Treacy

[57] ABSTRACT

Device for controlling the spin-drying speed in a washing machine having a d.c. motor. During spin-drying, the motor speed is limited by a resistor in a control circuit. During acceleration of the motor to spin-drying speed, the speed is limited to a minimum spin-drying speed, by a water level sensing switch contact connected to the resistor.

2 Claims, 1 Drawing Figure

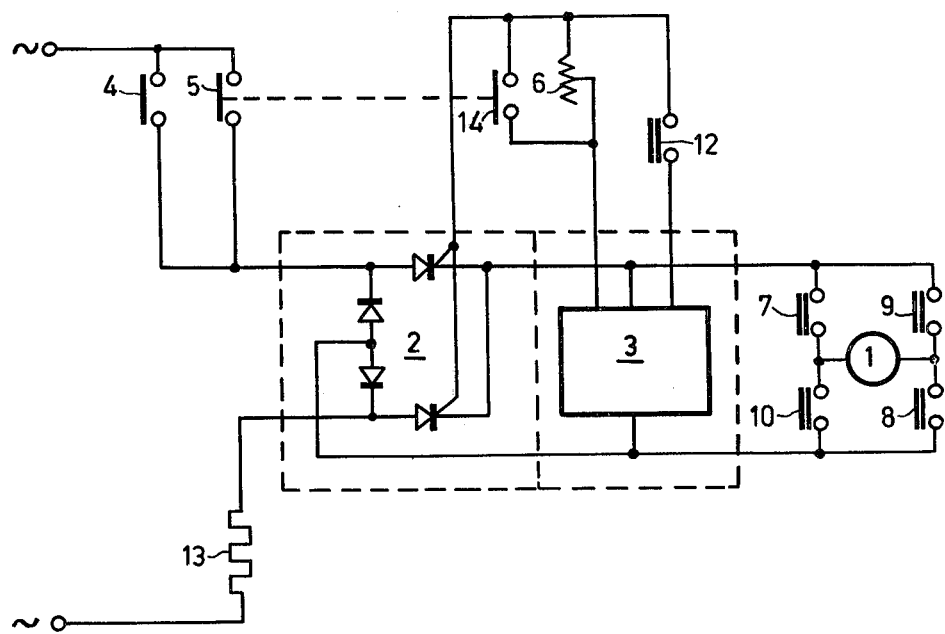

DEVICE FOR CONTROLLING THE SPIN-DRYING SPEED IN A WASHING MACHINE

The invention relates to a device for controlling the spin-drying speed in a washing-machine which comprises a motor for driving the drum, which motor can operate at two different speeds: a low washing speed and a high spin-drying speed; switching means which enable the passage from the washing speed to the spin-drying speed while the tub is filled with water, a water level control device, a variable resistor by means of which the maximum spin-drying speed can be determined via a motor supply control device which is controlled by a speed regulator.

From French Patent Specification No. 2,044,540, to which U.S. application Ser. No. 34,727, filed May 5, 1970, assigned to the assignee of this application, and now abandoned, corresponds, a washing-machine is known in which a distributing speed is obtained without the use of the additional speed changing device of a conventional motor which, in addition to windings for the low and high speeds, comprises a winding for each of the other speeds. In a machine according to that patent the motor torque is predetermined in such a way that when the electrical parameters which correspond both to the spin-drying speed and to a limited torque are applied to the motor, the motor speeds up and attains a speed which cannot increase as long as the total mass consisting of the drum, the load of laundry and the water contained in the tub is driven by the motor. The torque developed by the motor is counterbalanced by the reactive torque as a result of said total mass. Subsequently, while the tub still contains water, the drum speed will increase to a given value for which the motor torque equals the reactive torque produced by the braking effect of the water as a result of the friction of water between the walls of the drum and the tub. If the water level in the tub is maintained, said speed will remain constant. By the partial or complete drainage of the water, thus reducing the countertorque, a new level or the spin-drying speed can be attained. The electrical characteristics are substantially those of the motor and its power supply device, while the mechanical characteristics include the dimensions of the tub and the drum, the interior and exterior profiles of the drum, and the distance from the wall of the tub to that of the drum. The interior profile of the drum will influence the laundry movement and thus the length of time that the drum speed is kept constant for evenly distributing the laundry along the drum wall.

When said first period of constant speed is passed, the acceleration of the drum will have to be substantial so as to pass through the critical speed range as rapidly as possible. In the critical speed range, which varies per machine, the slightest unbalance of the load causes vibrations whose amplitude may increase in time and which may cause damage both to the housing and to the equipment attached thereto. Once said range is passed, though the rotation of the drum is accompanied by vibrations, they will be of sufficiently low amplitude not to present any problems. Moreover, beyond said range of critical speed the drum speed stabilizes and remains constant as long as the water level in the tub remains constant. In the example of the aforementioned French patent, said level is utilized for balancing, which is effected by the addition of unbalance-compensation masses, generally by filling compartments in the drum with water. The laundry distribution speed level, which occurs at approx. 70 rpm, is maintained comparatively briefly and its duration cannot be controlled in a simple manner because it is produced by a torque which varies in time, and which is owing to the unstable equilibrium obtained between the driving torque of the motor at spin-drying speed and the reactive torque as a result of the rotation of the total mass contained in the tub. In a washing-machine which employs that feature, the speed level is unlikely to be sufficiently large to ensure the optimum distribution of the mass of laundry, which in itself is not a major drawback because a subsequent balancing phase is provided. The main advantage is that the distribution speed level is obtained without special means, simply through suitable control of the driving torque of the motor at washing speed and mechanical features such as the dimensions of the drum, of the tub, and the water volume.

The invention evolves from the previously cited Specification but its object is to obtain a speed level which is maintained at a speed lower than the critical speed range as long as desired. The balancing speed of 200 rpm to which the level of the previous Specification automatically adjusts itself necessitates a special construction which is conceivable when a machine is concerned with a high spin-drying speed (1000 rpm) which must have a particularly good stability. Especially the water tightness of the tub must be very good, in order to withstand the overpressures which may be produced whilst the drum rotates at 200 rpm with 30 liters of water in the tub.

The device according to the invention allows the speed level to be controlled, requiring only a minimum number of additional elements. The device consists of a single low-priced element: a contact which is controlled by the water level, passing from the spin-drying speed with filled tub to the spin-drying speed being effected automatically as the water is drained from the tub.

The spin-drying speed control device in a washing-machine of the type which comprises a drive motor for the drum, which motor can operate at two different speeds: a low washing speed and a high spin drying speed, switching means which enable the passage from the washing speed to the spin-drying speed while the tub is filled with water, a water level control device, a variable resistor by means of which the maximum spin-drying speed can be determined via a motor supply control device which is controlled by a speed regulator, is provided by a speed regulator for a d.c. machine drive motor, the device including a variable resistor which determines the selected maximum spin-drying speed, said variable resistor being short-circuited by a delayed contact.

In different embodiments:
said delayed contact which short-circuits the variable resistor is provided in the water-level control device.
said delayed contact is a contact of a device which controls the water level in the tub.
said delayed contact is constituted by a second water-level control device.
said delayed contact is a timer contact.

The following descriptions and drawing are given by way of example in order that the invention be more fully understood.

The sole FIGURE of the drawing is a simplified electrical diagram of an embodiment of the invention.

The diagram shows a permanent-magnet d.c. motor 1. Said motor can be energized via a bridge rectifier 2 which comprises two diodes and two thyristors. The motor speed is regulated and controlled by a speed regulator 3, which device controls the motor supply via the control electrodes of the thyristors. A contact 4 which belongs to the timer is connected in parallel with the contact of the water-level control device 5 (pressostat) in the closed position, i.e. tub filled with water. A variable resistor 6 is included in series in the motor supply control circuit and limits the control current to such a value that the motor can attain the fixed spin-drying speed. The device for reversing the direction of rotation of the motor is represented by the contacts 7, 8, 9, 10, which by the alternate closure of 7, 8 and 9, 10 change the polarity at the motor terminals. The contact 12 which is included in the motor supply circuit at the spin-drying speed belongs to the reversing device and dictates the direction of rotation of the drum during spin-drying.

The device according to the invention is in particularly destined for a washing machine which comprises a motor 1 with a commutator which is supplied via a resistor 13, which resistor is used for heating the suds. The value of said resistor is selected so that the motor load may be as high as required without the permissible motor current being exceeded and such that the motor can rotate at a uniform speed, which speed decreases as the load increases. The motor will then have a high current consumption and the substantial power which is dissipated in the series resistor is used for heating the water.

In an embodiment of the device for driving the drum of a washing-machine, the permanent magnet d.c. motor 1 is supplied from the electric a.c. mains by a diode rectifier bridge 2 via a control device which in the diagram is represented by two thyristors. The application or interruption of the d.c. supply is effected via the control electrodes of the thyristor by means of a voltage which is produced by the motor speed regulator 3. Said regulator comprises a reference voltage generator, whose voltage is compared with the back e.m.f. developed by the motor when it operates as a generator during the time intervals in which it is not supplied by the rectified voltage. The motor speed is limited by including a resistor 6 in the circuit of the control electrodes of the thyristors. Generally, a variable resistor is used which may or may not be accessible for the user and by means of which the spin-drying speed can be adjusted to the desired value.

By means of the variable resistor 6 the spin-drying speed can be adjusted between two limits, a limit below and a limit above approximately 600 rpm. To obtain the maximum spin-drying speed, the resistance 6 must be very high, while for the minimum speed it must be zero. The spin-drying speed is fixed during starting of the machine at the same time as the other washing parameters and does not necessarily correspond to the lowest possible spin-drying speed. In one embodiment the minimum speed is fixed at 120 rpm. This is advantageous when the motor torque can be limited to the electrical characteristics which correspond to said minimum spin-drying speed in such a way that the motor torque and the reactive torque, owing to inter alia the mass of water in the filled tub, are balanced around said speed. This is rendered possible by short-circuiting the resistor 6 by a contact 14. The speed of the drum in the filled tub will then be limited to that which corresponds to a spin-drying speed, i.e. the lowest permissible spin-drying speed of the machine.

As the variable resistor 6 should only be switched out when the tub is filled with water, the contact 14 should be controlled by the water level in order to ensure that the selected spin-drying speed can be obtained when the tub is emptied.

The drainage of the tub is determined by the timer which controls the draining pump circuit.

In one embodiment the contact 14 is a second contact of the water level control device 5 (pressostat), the contacts 5 and 14 being mechanically coupled. The elements which form the device which limits the spin-drying speed with filled tub is therefore essentially a second contact 14 of the pressostat, thus providing at least one closed contact for the position with filled tub. A buffer resistor in the electronic device in series with the variable resistor limits the lowest spin-drying speed with filled tub, to a speed below the critical speed range, which range varies in accordance with the type of machine for which the supply and control device is destined.

The operation of the device is as follows: it is assumed that the washing cycle is completed, and the timer and reversing device have started the spin-drying cycle in the preferred direction by contact 12 of the reversing device being opened. The motor is energized via contact 4 of the timer and 5 of the water-level control device. The contact 14 which is coupled to the contact 5 of the pressostat is closed, for the tub is filled. In this case, the voltage which is produced by the regulator 3 is applied to the control electrodes of the thyristors and limits the speed to a value below the critical speed range. Said speed is limited to 120 rpm, which speed is below the critical speed range of the type of machine equipped with the device.

After acceleration to spin-drying speed and drainage of the tub (controlled by the timer) contact 14 opens, the variable resistor 6 being no longer short-circuited, the speed increases to the spin-drying speed which is selected and determined by the value of the resistor 6.

The contacts 5 and 14 may be mechanically coupled, but the contact 14 may also be incorporated in the pressostat which comprises the contact 5. The contact 14 may alternatively be constituted by the contact in "position filled tub" of a second pressostat.

Thus, the speed-limiting device, simply by the operation of the pressostat which is equipped with a second contact in position filled tub or of a second pressostat, permits a gradual acceleration to spin-drying speed with filled tub. Said gradual accelerataion is effected from a minimum speed to spin-drying with empty tub.

The advantages of such a device are, inter alia, a level before spin-drying at a speed which is as slow as desired, and so permits secondary effects on the water-tight tub owing to turbulence of the water to be reduced, thus allowing the use of construction materials which are lighter and which render it easier to make the tub watertight.

The contact 14 may alternatively be controlled by the timer, during starting of the draining pump or after a certain time.

What is claimed is:

1. In a washing machine of the type comprising a tub, a drum mounted for rotation within the tub, a d.c. motor for driving the drum at least at a low washing and a high spin-drying speed, a water level control device, switching means for changing from washing speed to spin-drying speed while the tub is filled with water, means for setting a maximum spin-drying speed, a motor supply control device, and electric speed regulator means responsive to the setting means for controlling said motor supply control device, an improved spin-drying control device comprising a switch contact responsive to the level of water in the tub, and wherein said setting means comprises a variable resistor, said speed regulator being responsive to the setting of a circuit comprising said switch contact connected to said variable resistor.

2. A device as claimed in claim 1 wherein said switch contact is connected in parallel with said resistor, the contact being closed when the tub is full of water, and the speed regulator response is such that minimum resistance of the variable resistor corresponds to minimum spin-drying speed.

* * * * *